Jan. 7, 1936.   D. B. HENDRYX   2,026,940
SHAPING REFRACTORY ARTICLES
Filed Dec. 13, 1934   2 Sheets-Sheet 1
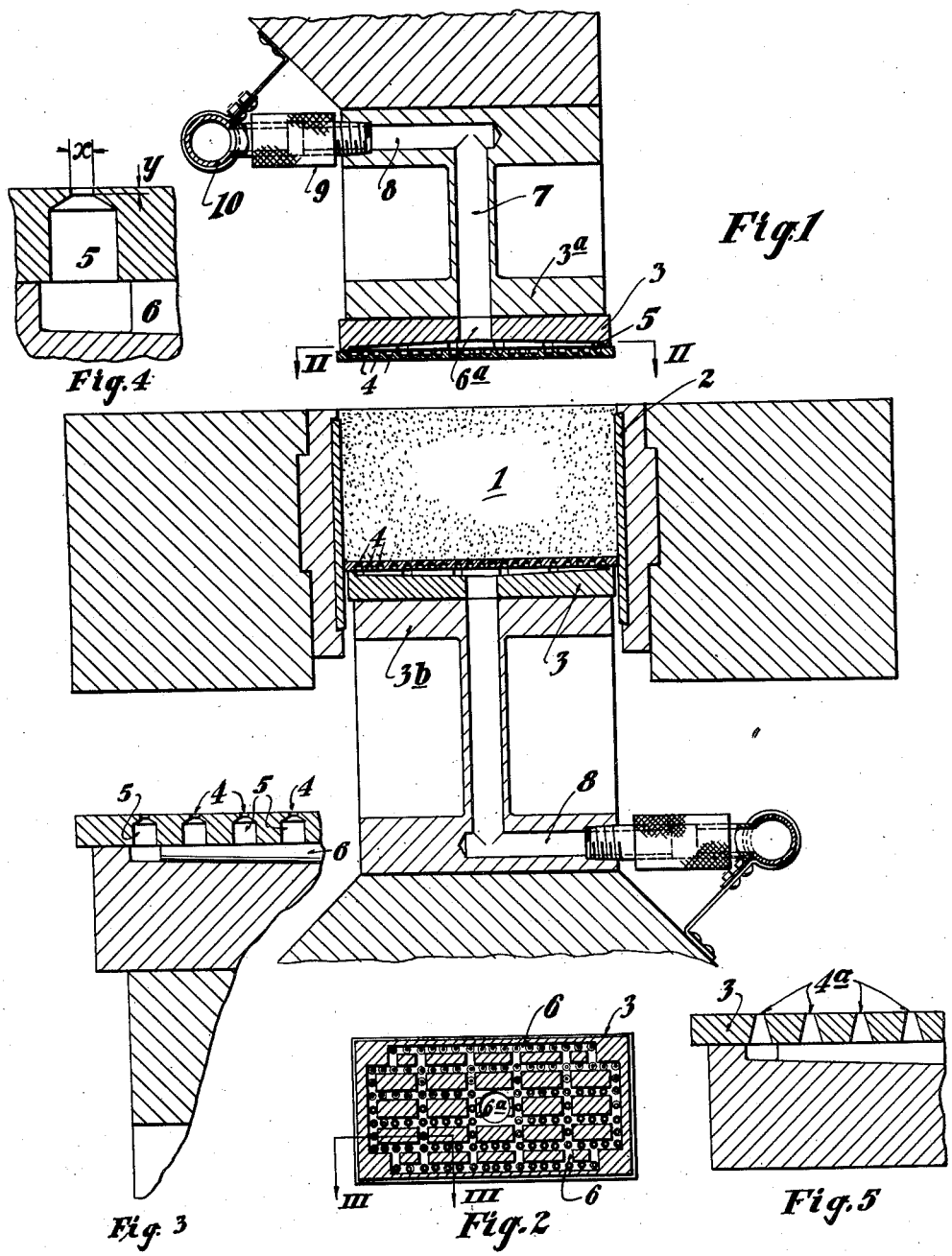

Jan. 7, 1936. D. B. HENDRYX 2,026,940
SHAPING REFRACTORY ARTICLES
Filed Dec. 13, 1934 2 Sheets-Sheet 2
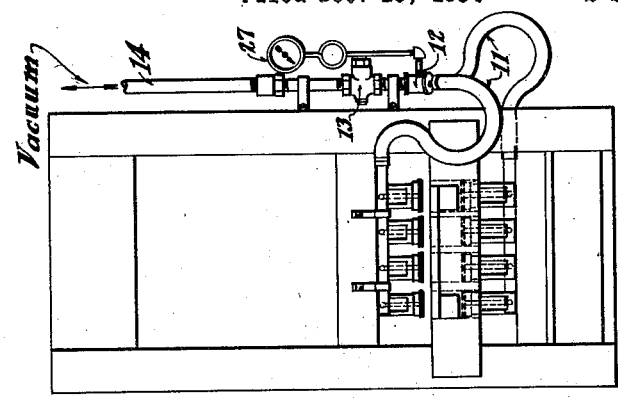
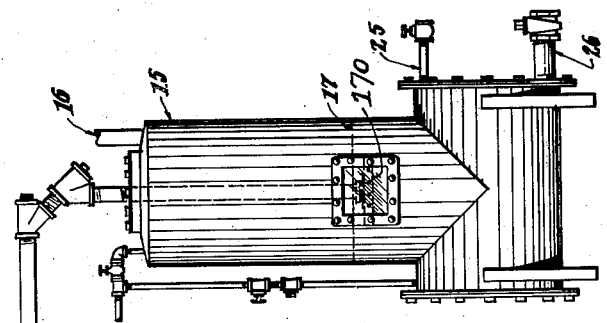
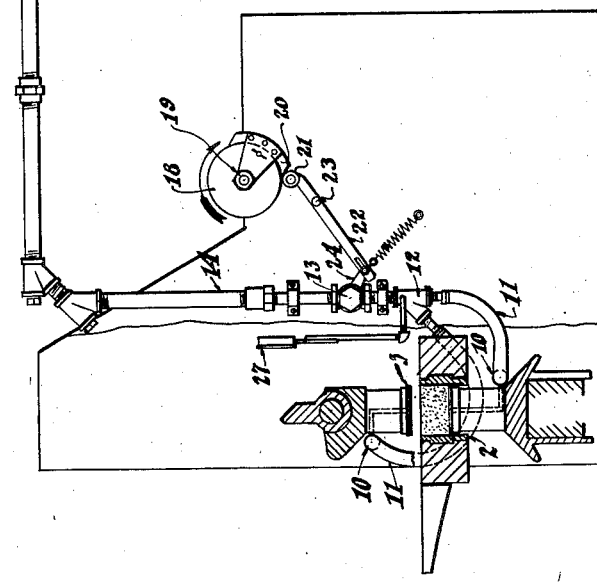
INVENTOR
Dwight B. Hendryx
by
Brown, Critchlow & Flick
his attorneys.

Patented Jan. 7, 1936

2,026,940

UNITED STATES PATENT OFFICE 2,026,940

SHAPING REFRACTORY ARTICLES

Dwight B. Hendryx, Pittsburgh, Pa., assignor to Harbison-Walker Refractories Company, Pittsburgh, Pa., a corporation of Pennsylvania Application December 13, 1934, Serial No. 757,313

10 Claims. (Cl. 25—45)

This invention relates to the forming of ceramic articles from dry, or semi-dry, batches, especially by pressing procedures.

Ceramic articles may be formed, or shaped, from dry or semi-dry batches, by compacting the batch in various ways, commonly by using mechanically or hydraulically actuated presses, although other means are applied, such as jolting a charge in a mold, the upper surface being acted upon by a top plate which usually is relatively heavy. However, although the invention is applicable generally to such procedures it will be described with particular reference to the power pressing of refractory articles by way of illustration, it being understood, however, that it is applicable to ceramic batches other than those of true refractory nature, and to other than power pressing operations.

As used in the ceramic art the terms "dry pressing" and "semi-dry pressing" have reference to procedures in which ceramic articles are formed by high pressure molding of ceramic batches containing moisture either in such amount as naturally occurs in the raw material of which the batch is composed, or only sufficient added moisture to bring the batch to a condition in which it is still a substantially dry granular product which will just merely hold together when it is squeezed in the hand. In these processes, therefore, the batch is in a relatively loose and dry state, in contradistinction to those processes of forming ceramic articles in which the batch is in the form of either a slip or a plastic mass. As used hereinafter the terms dry and semi-dry pressing contemplate such procedures and batches of the character just referred to, to the exclusion of ceramic batches which are plastic or in the form of a slip, and for brevity of reference the term "semi-dry pressing" will be used hereinafter as designating and including both.

Semi-dry pressing procedures have been used widely in the manufacture of formed or shaped ceramic articles because they are applicable to the production of physical and mechanical properties which are highly desirable in ceramic shapes. For instance, the very high pressures used in semi-dry pressing operations tend to produce good strength and desirable bulk density, together with other properties known to those familiar with these procedures.

In the semi-dry pressing procedures, however, a serious difficulty is encountered in the phenomenon commonly referred to as pressure cracking. Owing to the character of batches used in these procedures a substantial proportion of the volume of a charge is represented by air. In fact, in normal practice the volume of the pressed article is about half that of the loose granular charge prior to compression, so that of the volume occupied by a charge of batch in the mold, as much as half the volume may be free air, so that the volume of air is about as large as the volume of the article that has been formed.

Some of the air may pass from the mold around the edges of the plunger, or plungers, but experience has taught that all of the air can not be driven out of the material, in that manner, wherefore the residual air will be trapped inside of the charge undergoing compression. The high pressures used in these processes cause the trapped air to be highly compressed, and when the ram pressure is relieved the entrapped air will tend to expand within the formed article, thus causing the so-called pressure cracks or laminations.

Even where cracking does not occur the entrapment of air is disadvantageous, for the material in contact with the pressing plungers is compacted first, and the air which can not escape is thus forced to the center of the material where it holds the grains apart. Hence even though the air may not be compressed sufficiently to cause cracks, the center of the ware will be open and more porous than the outside regions, thus preventing the attainment of uniformity of mechanical properties throughout the shape. Furthermore, the smaller the size of the particles which compose the batch, and the greater their tendency to adhere when pressed, the greater will be the difficulty in properly pressing them in any desired shape without encountering the difficulties just mentioned. Also, it is more difficult for the air to escape from the middle of a large, thick, block shape, than from a smaller one.

The phenomenon of pressure cracking is now, and for some time past has been, known to be due to the presence of air within the mold chamber, as just described. The common commercial method of combatting the formation of pressure cracks is to reduce the pressure applied to the charge, using a toggle press the amount of batch fed to the mold is reduced, thereby lowering the effective pressure applied to the batch. In other words, the aim is to feed just sufficient batch to the mold to permit the use of as high a forming pressure as possible but just short of the pressure which will sufficiently compress the entrapped air to cause pressure cracking. With hydraulic presses the ram pressure may be regulated to achieve the same result. While this difficulty can be overcome in that manner, this particular solution is undesirable because thereby the forming pressure is reduced so that it is not possible to obtain as high bulk density as is desirable.

The bulk density of semi-dry pressed ceramic articles may be increased by increasing the forming pressure. Increase in bulk density is desirable not only because the mechanical strength of the product is improved thereby, but primarily because the increase in density provides greater resistance to penetration and erosion. Thus, other things being equal, the higher the density the less easy is it for slag, water, or other materials to penetrate, and the less easy is it for the article to be worn away under the action of weathering, slag movement, or the like. Also, the greater the density of the product the better will it resist attack of corrosive agents. Accordingly high bulk density is desirable, but it has not been attainable by the means of controlling pressure cracking hitherto available for commercial practice.

Ceramic articles made by dry pressing procedures are usually heated to relatively high temperatures after being pressed, to bond them into a dense, strong, hard structure. If the articles coming from the press are dense and without open voids between the grains they will be bonded more strongly, closely and tightly together during the firing than where they are porous. Also, a dense and strong pressed article will be less easily damaged by rough handling, either before or after firing. A further advantage of increased density is that the fired articles generally show less variation in dimensions than those which have a loose, open structure, as the dense articles are less readily squeezed out of shape at the temperatures used in the firing process.

In consequence of these advantages of increased bulk density it would be desirable to be able to operate in a semi-dry press procedure at a pressure adapted to produce the desired degree of density with the particular batch being operated upon. But for the reasons noted this has not been feasible because of the occurrence of pressure cracking.

In order to avoid the difficulties which arise from entrapment of air within the mold and at the same time to permit the use of high forming pressure it has been proposed (a) to evacuate the mold chamber, (b) to displace the air by means of a gas, or (c) to use special pressing cycles. Thus, it has been proposed to displace the air in the charge by means of a gas which is subsequently either absorbed by the refractory material or condensed by the pressure used, typical gases being butane, ethylene, ammonia, methane, and the like. Such a procedure is commercially disadvantageous, however, because most of the gases that might be used satisfactorily for this purpose are either toxic or flammable, or both, and because the costs of the refractory articles are increased due to the cost of the gas. In consequence of these and other disadvantageous features such gas procedures have not achieved commercial success.

As to pressing cycles, various proposals have been made in an attempt to overcome pressure cracking while permitting the use of desired high forming pressures. For instance, one suggestion has been to form the article under very high pressure irrespective of the formation of pressure cracks, then to relieve the pressure to permit the entrapped air to expand and escape, and then to repress in order to heal the cracks and laminations caused in the expansion cycle. Various other proposals embracing special pressing cycles have also been made, such as that of forming at high pressure and holding the article at the maximum pressing pressure for a period of time. The application of these special pressing cycles is commercially undesirable, however, both because they substantially increase pressing times, with consequent increase in manufacturing costs, and also because in general they can not be satisfactorily effected with the presses now in use. Their adoption, therefore, would necessitate replacement of existing equipment with new equipment adapted to the special cycles, with consequent great expense. For these and other reasons special pressing cycles have achieved no commercial significance.

The desirability of evacuating the mold to remove entrapped air has been recognized for many years; furthermore, it has been recognized as being the most desirable, theoretically, of the three modes of combating pressure cracking referred to above. But up to the time of this invention it has not been attained practically. It has been proposed, for example, to remove air from the mold chamber by drawing the air through the clearance space between the die plate, or ram head, and the mold walls. This is not applicable, however, to a complete solution of the problem because in the pressing operation the clearance space becomes sealed by the flow of batch material under the forming pressure. While some of the air may be removed through escape, or evacuation, through the clearance space, sufficient air remains to cause pressure cracking, because the air which remains in the mold chamber becomes compressed as the progress of pressing decreases the size of the voids, so that after the system has become sealed through flow of batch into the clearance space, further compression results in both horizontal and vertical movement of the entrapped air.

It has been proposed also to withdraw the air from the mold chamber, either through small openings formed in a wall of the mold chamber, or through a porous material interposed between the batch and one or more faces of the mold. These proposals likewise have resulted in commercial failure, the reason being that the openings have necessarily been small and have rapidly become clogged with fine particles from the batch, thus preventing any further substantial evacuation.

In point of fact, the difficulties that have been encountered in attempts to evacuate the mold chamber have led authorities in this field to state that the problems involved in evacuation of the mold chamber are so serious as to be probably insurmountable practically. Thus, as a result of the most recent investigation of the semi-dry pressing procedure, it was stated that, "Many difficulties may make direct evacuation of the mold-box highly impracticable commercially. With vacuum there is always danger of clogged vents." This research, reported in the Ohio State University Engineering Experiment Station Bulletin No. 82, published in March, 1934, represents the outcome of a number of years' careful investigation into the dry pressing procedure, having been conducted by the institution referred to, noted for its ceramic work, in collaboration with nine companies who collectively manufacture the preponderance of the semi-dry pressed ware in this country. The conclusion stated thus indicates that those most intimately associated with the problem have felt, prior to this invention, that the evacuation procedure is virtually precluded from commercial application.

In consequence of these difficulties the problem of effectively avoiding pressure cracking while applying desired forming pressure has remained unsolved up to the time of this invention, and as a result the manufacturer of refractories by dry pressing or other dry or semi-dry forming procedures has found it necessary to form the articles at moderately low forming pressures. This has militated against the achievement of satisfactorily low porosity (high bulk density), thus reducing the efficiency and desirability of the articles for certain types of service.

It is among the objects of this invention to provide a method of dry or semi-dry forming of ceramic, e. g., refractory, articles, particularly by pressing, in which air is removed from the mold chamber by evacuation during pressing, which provides for satisfactory evacuation of the material and the mold box to avoid difficulties encountered heretofore, permits the application of desired forming pressure with production of desired density, avoids pressure cracking, produces articles of improved character, and in the practice of which existing apparatus may be used with only slight change.

A further object of the invention is to provide a process embodying the foregoing features and in which evacuation is satisfactorily accomplished during the early stage of the pressing cycle, whereby air is removed prior to compacting the batch to a point where the air becomes trapped within the article.

Still another object of the invention is to provide simple and effective apparatus for practicing the method contemplated by the invention. Other objects will be recognized by those skilled in the art from the following description.

The invention may be described in connection with the accompanying drawings, in which Fig. 1 is a vertical section through the mold portion of a conventional type of press showing the preferred embodiment of the invention; Fig. 2 a horizontal sectional view through the die plate taken on line II—II of Fig. 1; Fig. 3 an enlarged scale fragmentary section taken on line III—III of Fig. 2; Fig. 4 a view on a still greater scale of one of the die plate openings illustrated in Fig. 3; Fig. 5 a view similar to Fig. 3, illustrating a modification; Fig. 6 an elevational view, partly in section, showing, somewhat schematically and on a reduced scale, a press such as illustrated in Fig. 1 together with ancillary equipment for the practice of the invention; and Fig. 7 a front view of the apparatus shown in Fig. 6.

As pointed out hereinabove, it has been proposed to withdraw air from the mold box in dry or semi-dry pressing of refractory materials under very high pressure. Such proposals have contemplated forming openings through a mold wall, or through the die pad, or the use of porous materials, and consequently such openings have been of relatively great length, so that particles of refractory material entering the openings have been unable to move through such relatively long, small diameter bores and the plastic flow of the clay under pressure has caused the bores to become plugged or sealed, thus making it impossible to adequately evacuate the mold chamber.

I have discovered, and it is on this that my invention is predicated, that in forming dry or semi-dry ceramic batches, as by pressing for example, the mold may be evacuated satisfactorily and with avoidance of the disadvantages encountered heretofore, by withdrawing the air through bores of small cross sectional area and of a length which is greatly restricted as compared with the length of the bores heretofore proposed or tried prior to my invention. The cross sectional area of the bores used in the practice of the invention, which desirably are cylindrical, is as small as possible, to prevent as far as possible the passing of batch material from the mold box into the evacuating system. Practically, however, it is not possible to make the openings small enough to entirely avoid discharge of material into them, and mere reduction of opening area with the constructions used heretofore does not suffice to avoid plugging.

A major feature of this invention resides in this, that the bores are so restricted in length that when a refractory particle enters the opening it can immediately pass through the opening without being retained therein, and thus with avoidance of plugging. In other words, the bore opening is small relative to the size of most of the batch particles, which prevents them from entering the bores, and the bore construction causes the fine streams of air passing therethrough to expand immediately upon passing from the interior surface of the mold to thereby expel such fine particles of batch as may be carried into the bores by the air streams. Suitably these bores are of a length no greater than the diameter of a particle which may enter them; most advantageously the length of the bore is less than its diameter of the opening.

Such small sectional area-short length bores may be formed in a variety of ways. They may, for example, terminate in a large area conduit, or system of conduits, associated with an evacuating system. Advantageously the short length bore which characterizes this invention terminates in a larger bore whose sectional area is such that a particle entering and passing the former can not possibly clog the latter, and to permit its being rapidly removed under the action of the evacuating system, to which the larger bore is connected. In other words, in the preferred practice of the invention the air is withdrawn through bores which comprise an inner portion of small sectional area and of greatly restricted length, and an outer portion continuous with the inner portion but of relatively large sectional area. Openings adapted to prevent the entry of most of the particles in the refractory batch, but adapted equally to pass rapidly and certainly such particles as do enter, may be formed in other ways, examples of which will be described hereinafter.

The invention thus makes it possible satisfactorily and continuously to evacuate the mold chamber during the compacting and forming operation, whereby all, or substantially all, of the air may be removed, with avoidance of pressure cracking, and in pressing with the ability to use any desired degree of pressure, within the limits of the press, and thereby to control the properties of the article as desired. Plugging, or sealing, of the openings is avoided, so that the difficulties heretofore encountered in evacuation of the mold chamber in a high pressure dry or semi-dry pressing operation are avoided. These features have been amply demonstrated in commercial operation.

The invention may be described further with reference to the accompanying drawings. Fig. 1 shows a conventional type of toggle press comprising a mold chamber 1 formed between side walls 2 and upper and lower die plates 3 carried by plungers 3a and 3b, positively reciprocable within the mold chamber by any suitable means, such as through mechanical or hydraulic actuation. Because such details of the press do not concern this invention they are not described and shown herein. It will be understood that it is applicable also to presses having one moving plunger, and to other types of apparatus for compacting ceramic batch to shape it.

In accordance with the invention one or more walls of the mold are provided with openings of the type just referred to. These openings may be formed in the side walls, but in the embodiment shown they are formed in the die pads, or plates, 3. Having reference to Figs. 2 and 3, each of the die pads is provided with a large number of bores 4 of very small diameter and of greatly restricted length, as described hereinabove. The actual diameter of bores 4 will depend upon the fineness of material which is being pressed, the bore being of such diameter as to permit air to be withdrawn from the mold without removing any material amount of the fine material. For many purposes it has been found that bores $\frac{1}{16}$ inch in diameter operate satisfactorily.

In the form shown in Figs. 1 to 4 these bores are of greatly restricted length, both relative to the size of particle which may enter them, and to the diameter of the opening. This is shown in Fig. 4, from which it appears clearly that the diameter X of the bore is greater than the length Y of bore 4.

These bores may lead directly to an evacuating system so constructed that any material passing through the bores is rapidly removed and can not cause clogging. In the preferred practice of the invention, however, the bores 4 formed in the die plate, or die pad, terminate at their outer ends in an extension bore 5 of greatly increased diameter, Figs. 3 and 4. Thus it will be seen that any particle capable of entering bores 4 will not remain or become lodged therein owing to the restricted length of the bores, and that once it has passed beyond bore 4 it will immediately pass through the evacuating system. Because of the large diameter of bores 5 their length is not material, since the sectional area of these bores is such that a particle capable of passing bores 4 can not lodge in and clog bores 5.

Evacuation is effected by providing the upper surface of the die plates 3 with a plurality of interconnecting channels 6, Fig. 2, forming conduits connecting all of the bores with a central bore 6a aligned with an air passage 7 formed in the rams 3a and 3b. Each air passage 7 is connected by a branch passage 8 and a coupling 9 to a manifold connection 10 connected to a flexible hose 11. Hoses 11 lead to a Y-coupling 12 whose third opening is connected to a 3-way valve 13 associated with a source of vacuum, such as a vacuum pump.

In the embodiment shown valve 13 is connected by a pipe 14 to a vacuum supply tank 15 in which vacuum is created, as by a vacuum pump, not shown, connected to the tank by a pipe 16. Where a vacuum pump is used for evacuating the system it is necessary to remove the fine dust carried by the air drawn from the mold box, prior to exhaustion of the air through the pump, for the dust would cause such wear of the moving parts of the pump as to reduce its evacuating efficiency. In the preferred embodiment of the invention the air drawn from the mold box is washed before it reaches the pump, and in the embodiment shown pipe 14 extends downwardly into tank 15 and is provided at its lower end with an inverted cup 170 having perforations formed in its side walls. Tank 15 contains water to a level 17 somewhat above cup 170, so that the cup is water sealed and the air must pass through the water before it reaches the pump, thus removing any particles of ceramic material carried by the batch from the air and avoiding damage to the pump.

For the best results the exhausting capacity of the equipment should be large relative to the size of the bores and passages to the valves, and also relative to the volume of air to be withdrawn, to avoid a large drop in the effective vacuum when removing the air. This is indicated in Fig. 6 by the use of pipe connections and a vacuum tank, which are large relative to the bores and volume of air to be removed. This permits the use of a relatively small vacuum pump to maintain the necessary degree of vacuum since the larger the storage space between the valve and the pump, the less will be the drop in vacuum when the valve is opened, with greater effectiveness of the system.

Valve 13 serves in one position to connect the mold box to the evacuating system, through pipe 14 and Y-connection 12 and hoses 11. It is actuated in any suitable manner to apply the vacuum to the press at the proper time. Valve 13 is preferably mechanically actuated in synchronism with the press movements, and the invention also provides means for doing this. Having reference to Fig. 6, the means provided comprises a cam 18 keyed on a shaft 19 rotated in any desired manner, preferably by actuation from the press crank shaft to ensure the desired synchronism. The cam shown, which makes one revolution for each pressing stroke, is provided with a land 20 adapted to engage a follower 21 mounted on a lever 22 pivoted at 23, the other end of the lever being connected to an actuating rod 24 for turning the valve.

In operation in accordance with the invention a charge of refractory batch is fed into mold box 1 in any suitable manner. In this part of the cycle of the press shown plunger 3a is above the mold box, and plunger 3b is positioned with its die pad 3 within the lower end of the mold box. At this time vacuum most suitably is not applied to the press system, valve 13 being in such a position as to cut hoses 11 off from pipe 14. As plunger 3a descends, cam 18 revolves, and at the proper time land 20 actuates lever 22 to place hoses 11 in communication with pipe 14, thus starting evacuation of the press system through bores 5, 4 of die plates 3. In the preferred practice of the invention the valve is operated to apply vacuum through the connections described an instant before the plunger enters the mold box, so that the system is at least partly evacuated at the moment the plunger enters the box, thus correspondingly reducing the length of the pressing cycle.

As the plungers cooperate to compact the charge vacuum is continuously applied to the mold box, thus progressively evacuating it, and such action continues as the condensing of the batch proceeds. Through the construction of the bores in the die plates the evacuation is not interfered with, as the bores remain open even though refractory particles are drawn into them under the action of the vacuum. Such particles are washed out of the air in tank 15, which is provided at its lower end with pipes 25 and 26 for removing and washing out the mud which thereby accumulates in the tank.

For most purposes it will be desirable to apply as high a degree of evacuation as possible, for reasons which will be understood by those familiar with semi-dry pressing. The apparatus may include a vacuum gauge 27 to measure the vacuum in the system.

Evacuation continues advantageously until the plungers have completed their pressing stroke, to ensure as complete removal of air as possible and thus to substantially avoid the danger of formation of pressure cracks or laminations. At the end of the pressing stroke the valve actuating means again cuts off the vacuum in hoses 11, and preferably in this position of the valve pipe 14 is closed and the valve is open to the atmosphere to break the vacuum in the mold box, although the breaking of the vacuum may be accomplished in other ways. When the pressed article has been expelled the press is ready for another charge, and the cycle is repeated.

The invention is not limited to the form and details described hereinabove, which are given to illustrate the principles embodied in the invention. For example, the bores may assume other forms which prevent clogging by refractory particles. One such modification is shown in Fig. 5, in which die plate 3 is provided with truncated conical bores 4a positioned with the plane of truncation at the surface of the die plate and to provide, as in the other embodiment, openings small enough to prevent any substantial portion of batch from entering the bores. In this embodiment the conical form provides abrupt widening of the bore from the opening rearwardly, so that any particle that can enter the bore will be immediately swept away under the action of the vacuum. It will be observed that in this form the small-area portion of the bore lies substantially in a plane, so that the length of this portion of the bore is negligible, while most of the bore corresponds to outer portion 5 of the bores described in connection with Figs. 1 to 4.

Nor is the invention restricted to provision of the bores in the die plates, for they may be formed in the mold walls, or in the walls and plates. Also, it is applicable to presses in which only one plunger moves. In the apparatus shown in Fig. 6, the vacuum is applied simultaneously to both die plates, preferably, as described, an instant before plunger 3a enters the mold. If desired, however, vacuum may be applied to the bottom die plate or side faces of the mold prior to the time when the upper plunger is ready to enter the mold, by using two valves instead of valve 13; in this case the die plates would be connected to separate valves actuated to create and cut off vacuum in the die plates in the desired sequence and in synchronism with the pressing cycle.

Likewise, since fine dust will in most instances find its way through the bores and into the evacuating system it may be desired to provide for blowing out the system, or a portion of it, periodically, for example once in each pressing cycle. To this end an auxiliary valve may be disposed in the vacuum closely adjacent the plunger or plungers, as in couplings 9, the valve being opened for a brief period in each cycle of the press after the air has been removed from the mold and the pressing completed, but while vacuum is still applied, to supply a rush of air in sufficient volume to sweep fine dust from the piping and valve into the air washing tank. Similarly, compressed air may be supplied for a brief interval to the various passages between the valve 13 and the bores to blow accumulated material from those passages, and particularly the bores.

It will be understood also that although for purposes of description the invention has been exemplified as applied to power presses, it is applicable equally to other modes of compacting dry and semi-dry ceramic batches to shape, or form, them. Thus, it may be applied to jolting or the like procedures in which a charge is placed in a mold and subjected to jarring, or jolting, while the top of the charge is confined by a movable top plate. In such a case the most desirable means of applying the invention would be to form the bores in the mold walls.

According to the provisions of the patent statutes, I have explained the principle and mode of operation of my invention and have illustrated and described what I now consider to represent its best embodiment. However, I desire to have it understood that, within the scope of the appended claims, the invention may be practiced otherwise than as specifically illustrated and described.

I claim:

1. An apparatus for pressing semi-dry ceramic material under high pressure comprising a mold, means for applying pressure to batch of such material in the mold, a face of said mold being provided with a plurality of bores of relatively small sectional area and of a length less than the diameter of particles capable of entering the bores, means for creating vacuum, and a connection between said vacuum means and said bores for evacuating the mold.

2. An apparatus for pressing semi-dry ceramic material under high pressure comprising a mold, means for applying pressure to batch of such material in the mold, a face of said mold being provided with a plurality of bores of relatively small sectional area and of a length less than the greatest dimension of the opening of the bore, means for creating vacuum, and a connection between said vacuum means and said bores for evacuating the mold.

3. An apparatus for pressing semi-dry ceramic material under high pressure comprising a mold, means for applying pressure to batch of such material in the mold, a face of said mold being provided with a plurality of cylindrical bores of relatively small diameter and of a length less than the diameter of the bore, means for creating vacuum, and a connection between said vacuum means and said bores for evacuating the mold.

4. An apparatus for pressing semi-dry ceramic material under high pressure comprising a mold, means for applying pressure to batch of such material in the mold, a face of said mold being provided with a plurality of truncated conical bores having their small ends of restricted diameter and positioned at the mold face, means for creating vacuum, and a connection between said vacuum means and said bores for evacuating the mold.

5. An apparatus for pressing semi-dry ceramic material under high pressure comprising a mold, means for applying pressure to batch of such material in the mold, a face of said mold being provided with a plurality of bores comprising an inner portion of relatively small sectional area and of a length less than the greatest dimension of the opening of the bore, and an outer portion of large sectional area relative to that of said inner portion, means for creating vacuum, and a connection between said vacuum means and said bores for evacuating the mold.

6. An apparatus for pressing semi-dry ceramic material under high pressure comprising a mold, means for applying pressure to batch of such material in the mold, a face of said mold being provided with a plurality of bores of relatively small sectional area and of a length less than the greatest dimension of the opening of the bore, means for creating vacuum, a connection between said vacuum means and said openings for evacuating the mold, a valve in said connection, and valve-actuating means actuated in synchronism with the press to apply vacuum to the mold through said bores during the pressing operation.

7. An apparatus for pressing semi-dry ceramic material under high pressure comprising a mold, a plunger movable within the mold and having its batch contacting face provided with a plurality of bores of small sectional area and of a length less than the greatest dimension of the bore opening, means actuating said plunger to reciprocate it within the mold, means for creating vacuum, and a connection between said vacuum means and said bores for evacuating the mold chamber.

8. An apparatus for pressing semi-dry ceramic material under high pressure comprising a mold, a plunger movable within the mold and having its batch contacting face provided with a plurality of bores of small diameter and of a length less than said diameter, means actuating said plunger to reciprocate it within the mold, means for creating vacuum, and a connection between said vacuum means and said bores for evacuating the mold chamber.

9. In a press according to claim 8, a valve in said connection, and valve-actuating means actuated in synchronism with the press to connect said bores and vacuum means during the pressure applying movement of said plunger.

10. The method of forming from semi-dry ceramic material a dense molded body thereof substantially free from pressure cracks, comprising compressing a body of said material in a mold under high pressure, and simultaneously therewith evacuating the air from the mold and the material in a multiplicity of small-diameter streams which are expanded immediately upon their passage from the interior surface of the mold to expel particles of the material carried by the streams.

DWIGHT B. HENDRYX.